(12) United States Patent
Tenny

(10) Patent No.: US 8,195,943 B2
(45) Date of Patent: *Jun. 5, 2012

(54) SIGNALING WITH OPAQUE UE IDENTITIES

(75) Inventor: Nathan Edward Tenny, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 1315 days.

This patent is subject to a terminal disclaimer.

(21) Appl. No.: 11/673,533

(22) Filed: Feb. 9, 2007

(65) Prior Publication Data

US 2007/0226502 A1    Sep. 27, 2007

Related U.S. Application Data

(60) Provisional application No. 60/771,974, filed on Feb. 10, 2006, provisional application No. 60/786,463, filed on Mar. 27, 2006.

(51) Int. Cl.
*H04L 9/00* (2006.01)
*H04L 9/32* (2006.01)
*G06F 7/04* (2006.01)

(52) U.S. Cl. ........ 713/170; 713/168; 713/169; 713/172; 713/273; 713/174; 726/27; 726/28; 726/29; 726/30

(58) Field of Classification Search .................. 713/170
See application file for complete search history.

(56) References Cited

U.S. PATENT DOCUMENTS

| | | | |
|---|---|---|---|
| 5,889,861 A | 3/1999 | Ohashi et al. | |
| 5,987,128 A | 11/1999 | Baba | |
| 5,987,129 A | 11/1999 | Baba | |
| 6,256,301 B1 * | 7/2001 | Tiedemann et al. | .......... 370/342 |
| 6,463,154 B1 | 10/2002 | Patel | |
| 6,510,461 B1 | 1/2003 | Nielsen | |

(Continued)

FOREIGN PATENT DOCUMENTS

CN    148339 A    4/2004

(Continued)

OTHER PUBLICATIONS

Barbeau, et al.: "Perfect identity concealment in UMTS over radio access links," Wireless and Mobile Computing, Networking and Communications, pp. 72, 2-6 (WIMOB' 2005), IEEE International Conference in Montreal, Canada, Aug. 22-24, 2005.

(Continued)

*Primary Examiner* — Longbit Chai
(74) *Attorney, Agent, or Firm* — Kam T. Tam

(57) ABSTRACT

Techniques for deriving temporary identifiers (IDs) used to address specific user equipments (UEs) in a wireless communication network are described. At a network entity, a first ID assigned to a UE and additional information such as, e.g., a salt value and/or shared secret data for the UE, are transformed to obtain a second ID for the UE. The first ID and/or the shared secret data may be updated, e.g., whenever a signaling message is sent to the UE. A signaling message directed to the UE is generated based on the second ID and sent via a common channel. At the UE, a message is received via the common channel. The first ID and additional information such as, e.g., a salt value obtained from the received message and/or shared secret data for the UE, are transformed to obtain the second ID, which is used to determine whether the received message is intended for the UE.

43 Claims, 10 Drawing Sheets

U.S. PATENT DOCUMENTS

| | | | |
|---|---|---|---|
| 6,757,722 B2 | 6/2004 | Lonnfors et al. | |
| 6,763,112 B1 | 7/2004 | Haumont | |
| 7,046,992 B2 | 5/2006 | Wallentin et al. | |
| 7,240,202 B1 | 7/2007 | Orman | |
| 7,310,525 B2 | 12/2007 | Takase et al. | |
| 7,356,146 B2 | 4/2008 | Yi et al. | |
| 7,515,713 B2 | 4/2009 | Quick, Jr. et al. | |
| 7,706,539 B2 | 4/2010 | Jang et al. | |
| 2003/0101139 A1 | 5/2003 | Kaag | |
| 2003/0105964 A1* | 6/2003 | Brainard et al. | 713/178 |
| 2004/0064730 A1 | 4/2004 | Kamiyama et al. | |
| 2005/0165838 A1 | 7/2005 | Fontoura et al. | |
| 2005/0281216 A1 | 12/2005 | Varonen et al. | |
| 2006/0025162 A1 | 2/2006 | Cao et al. | |
| 2006/0034456 A1 | 2/2006 | McGough | |
| 2006/0248079 A1 | 11/2006 | Braica | |
| 2007/0047478 A1* | 3/2007 | Balachandran et al. | 370/328 |
| 2007/0101133 A1 | 5/2007 | Liu et al. | |
| 2007/0168662 A1 | 7/2007 | Escott et al. | |
| 2007/0218901 A1 | 9/2007 | Tenny | |
| 2008/0065548 A1 | 3/2008 | Muijen | |
| 2008/0187137 A1 | 8/2008 | Nikander et al. | |
| 2008/0273610 A1 | 11/2008 | Malladi et al. | |

FOREIGN PATENT DOCUMENTS

| | | |
|---|---|---|
| EP | 1337125 | 8/2003 |
| EP | 1379029 | 1/2004 |
| EP | 1427245 | 6/2004 |
| EP | 1613017 | 1/2006 |
| JP | 2000115161 A | 4/2000 |
| JP | 2005236939 A | 9/2005 |
| KR | 1020040004925 | 1/2004 |
| RU | 98117712 | 6/2000 |
| RU | 98117608 | 7/2000 |
| RU | 2253948 | 6/2005 |
| RU | 2292648 | 1/2007 |
| TW | I239184 | 9/2005 |
| TW | I243553 | 11/2005 |
| TW | 200605593 | 4/2006 |
| WO | 0030391 | 5/2000 |
| WO | WO 00/30391 * | 5/2000 |
| WO | WO0054521 A2 | 9/2000 |
| WO | 0124562 | 4/2001 |
| WO | WO03055142 | 7/2003 |
| WO | WO2004028041 | 4/2004 |
| WO | WO2007072814 A1 | 6/2007 |

OTHER PUBLICATIONS

ETSI TS 133 102 v6.4.0; "Universal Mobile Telecommunications System," ETSI Standards, European Telecommunications Standards Institute, Sophia-Antipo, FR, 3GPP TS 33.102 version 6.4.0 Release 6, XP014032861, Sep. 2005.

International Search Report—PCT/US2007/061946, International Searching Authority—European Patent Office—Jul. 17, 2007.

Written Opinion—PCT/US2007/061946, International Searching Authority—European Patent Office—Jul. 17, 2007.

International Preliminary Report on Patentability—PCT/US2007/061946, International Bureau of WIPO—Geneva, Switzerland—Aug. 12, 2008.

Taiwanese Search report—096105044—TIPO —Jul. 20, 2010.

Taiwanese Search report—096105045—TIPO—Sep. 25, 2010.

S. A. Weis, S. E. Sarma, R. L. Rivest and D. W. Engels, "Security and Privacy Aspects of Low-Cost Radio Frequency Identification Systems", [online], Security in Pervasive Computing 2003, 2004, LNCS 2802, pp. 201-212, <URL:http://citeseerx.ist.psu.edu/viewdoc/summary?doi=10.1.1.1.8095>.

* cited by examiner

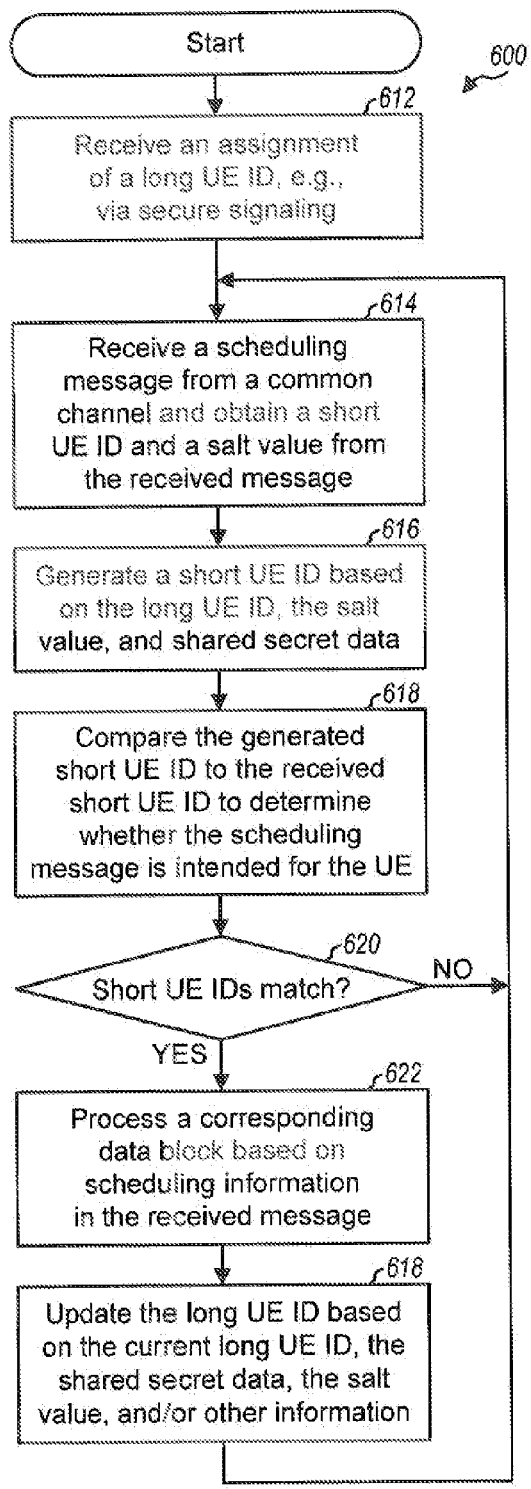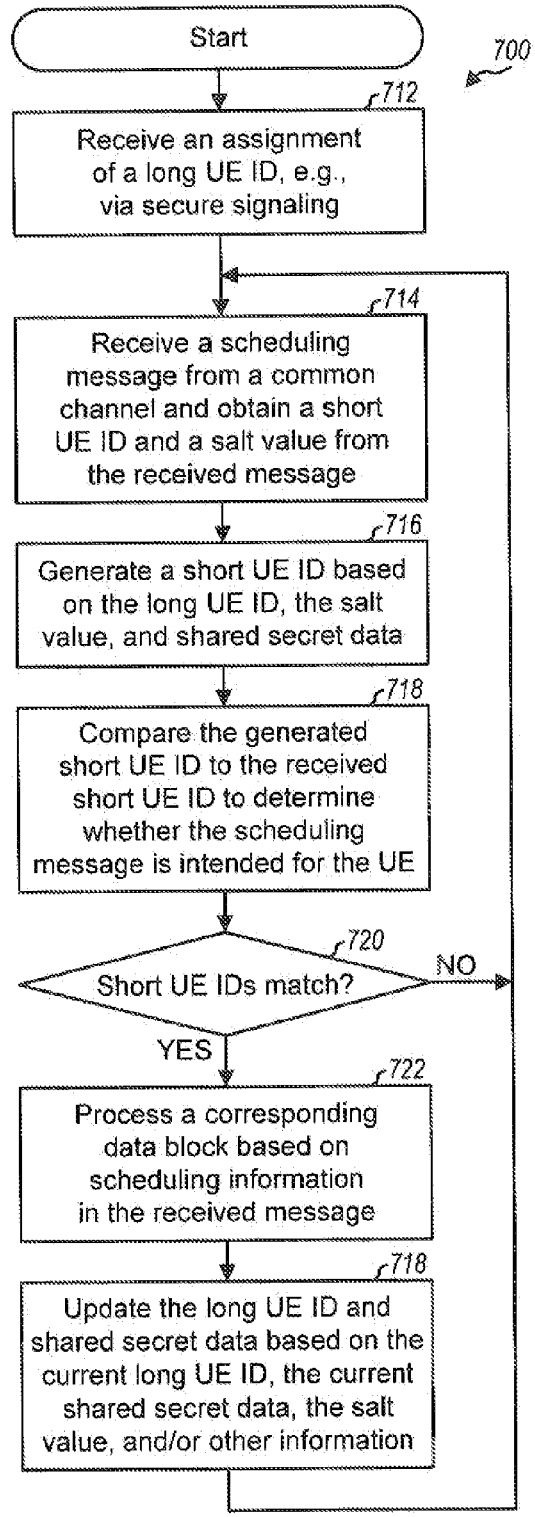
FIG. 6
FIG. 7

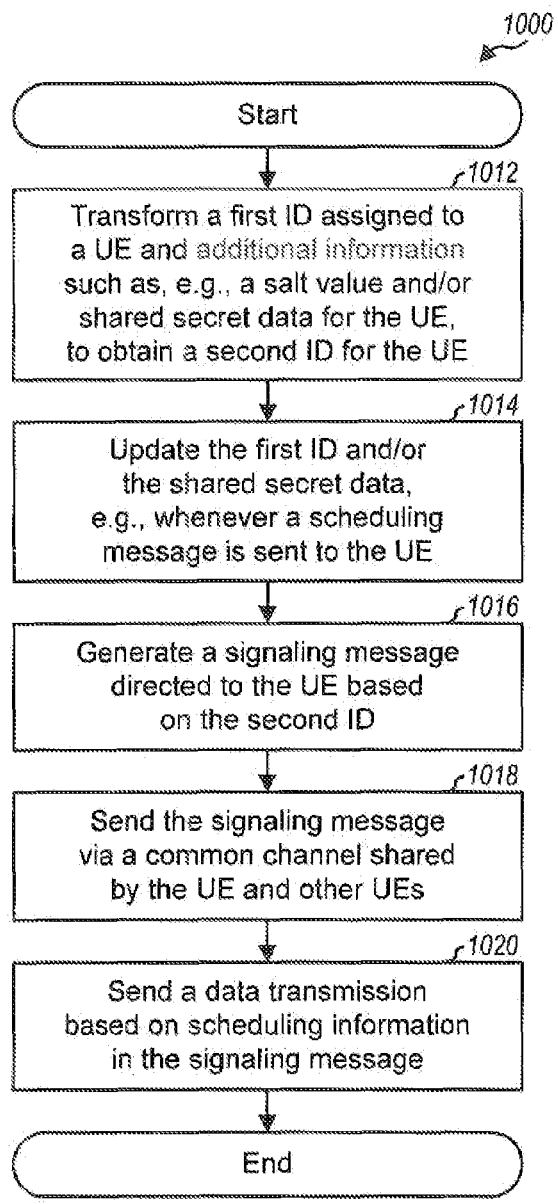

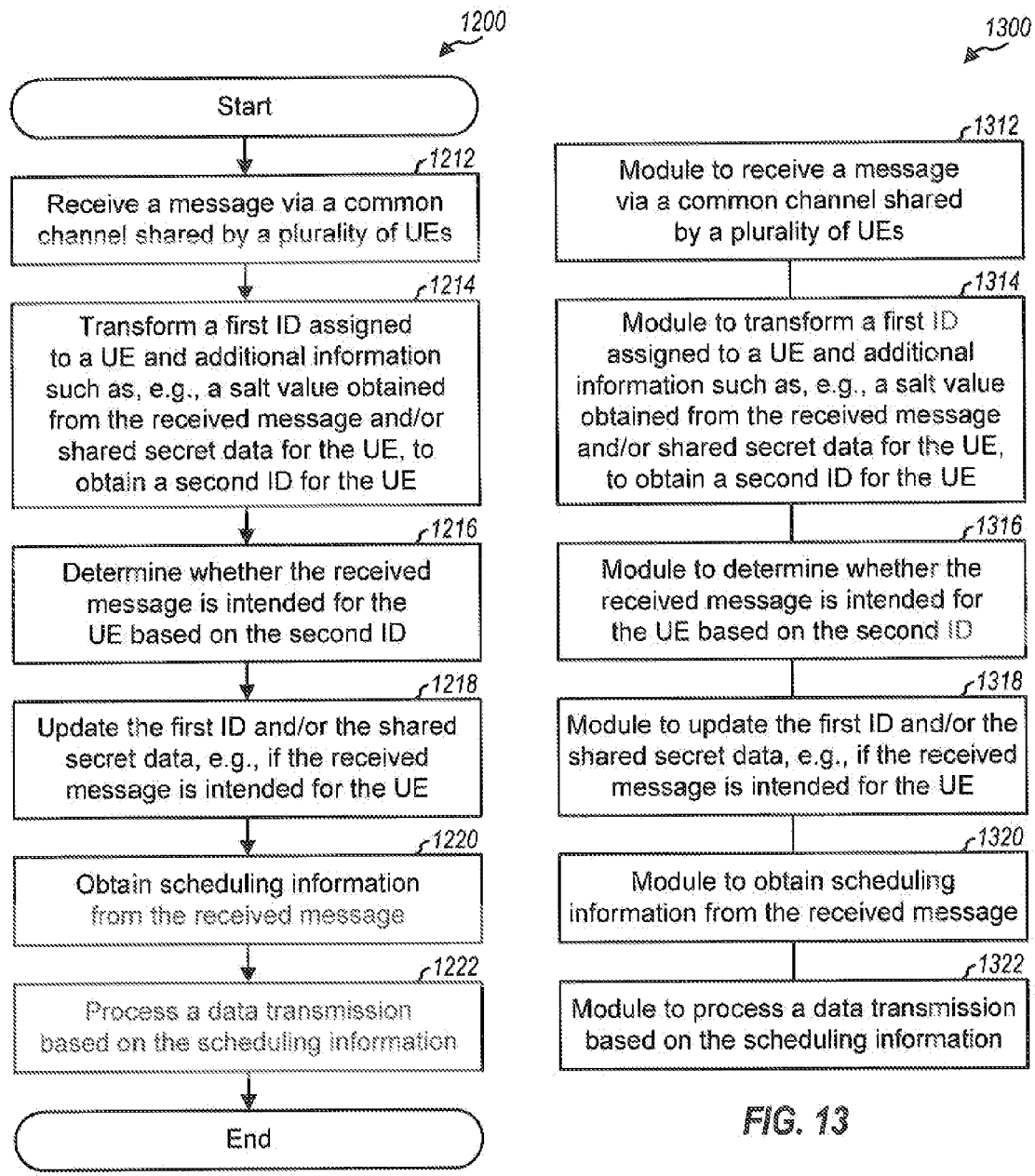

SIGNALING WITH OPAQUE UE IDENTITIES

The present application claims priority to provisional U.S. Application Ser. No. 60/771,974, entitled "OBSCURING TEMPORARY USER EQUIPMENT IDENTITIES," filed Feb. 10, 2006, and provisional U.S. Application Ser. No. 60/786,463, entitled "DOWNLINK DATA SCHEDULING WITH OPAQUE UE IDENTITIES IN E-UTRAN," filed Mar. 27, 2006, both assigned to the assignee hereof and incorporated herein by reference.

BACKGROUND

I. Field

The present disclosure relates generally to communication, and more specifically to techniques for sending signaling with temporary identities.

II. Background

Wireless communication networks are widely deployed to provide various communication services such as voice, video, packet data, messaging, broadcast, etc. A wireless communication network may include many Node Bs (or base stations) that may communicate with many user equipments (UEs). The UEs may be assigned various identifiers or identities (IDs) used to uniquely identify these UEs for various purposes. In certain instances, the UE IDs may be sent over the air in the clear without any ciphering. This may make it possible for an eavesdropper or attacker to mount a linkability attack by monitoring a communication channel for messages and determining which messages are directed to the same UE over time. The linkability attack may be able to link messages to specific UEs but may not be able to determine the true identities of the UEs. The linkability attack may be used to track the locations of the UEs and may also be the basis of other more sever security attacks. For example, the attacker may be able to determine which UE ID is assigned to a particular UE by initiating a call to that UE and observing which UE IDs are used at approximately the same time.

There is therefore a need in the art for techniques to combat linkability attacks without imposing excessive computational burdens at the UEs and network entities.

SUMMARY

Techniques for deriving temporary IDs used to address specific UEs in a wireless communication network are described herein. The temporary IDs may be used for various types of messages sent to the UEs in the clear without ciphering via common channels. The techniques may be used to improve security, e.g., to foil linkability attacks.

In an aspect, at a network entity (e.g., a Node B), a first ID assigned to a UE and additional information such as, e.g., a salt value and/or shared secret data for the UE, may be transformed to obtain a second ID for the UE. The first ID may be a long UE ID that may be assigned to the UE by any network entity. The salt value is a non-static value that may be selected in any manner. The shared secret data may be any data that is known by both the UE and the network entity. The shared secret data may be agreed upon or determined in a separate operation, e.g., provisioning with the user's home network at the time of subscription. The first ID and/or the shared secret data may also be updated, e.g., whenever a signaling message is sent to the UE. A signaling message directed to the UE may be generated based on the second ID and may include signaling information, the second ID, the salt value, etc. The signaling message may also include a flag that may be set if loss of synchronization of the first ID is detected. The signaling message may be a scheduling message, a paging message, or some other message and may be sent via a common channel shared by the UE and other UEs. If the signaling message is a signaling message, then a data transmission may be sent to the UE based on scheduling information included in the scheduling message.

In another aspect, at the UE, a message may be received via the common channel. The first ID and additional information, such as, e.g., a salt value obtained from the received message and/or shared secret data for the UE, may be transformed to obtain the second ID, which may be used to determine whether the received message is intended for the UE. The received message may be matched based on a previous first ID or a current first ID depending on the flag (if sent) in the received message. If the received message is a scheduling message intended for the UE, then scheduling information may be obtained from the received message, and the corresponding data transmission may be processed based on the scheduling information. The first ID and/or the shared secret data may be updated, e.g., whenever a signaling message intended for the UE is received. A re-synchronization mechanism may be used to ensure synchronization of the first ID and/or the shared secret data at the UE and the network entity.

Various aspects and features of the disclosure are described in further detail below.

BRIEF DESCRIPTION OF THE DRAWINGS

FIG. 6 shows a process for receiving scheduling messages and data and updating a long UE ID.

FIG. 7 shows a process for receiving scheduling messages and data and updating a long UE ID and shared secret data.

FIG. 10 shows a process for sending signaling messages and data to a UE.

FIG. 11 shows an apparatus for sending signaling messages and data to a UE.

FIG. 12 shows a process for receiving signaling messages and data at a UE.

FIG. 13 shows an apparatus for receiving signaling messages and data at a UE.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), Evolved UTRA (E-UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Long Term Evolution (LTE), IEEE 802.20, Flash-OFDM®, etc. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and 3GPP terminology is used in much of the description below.

Figure 1:
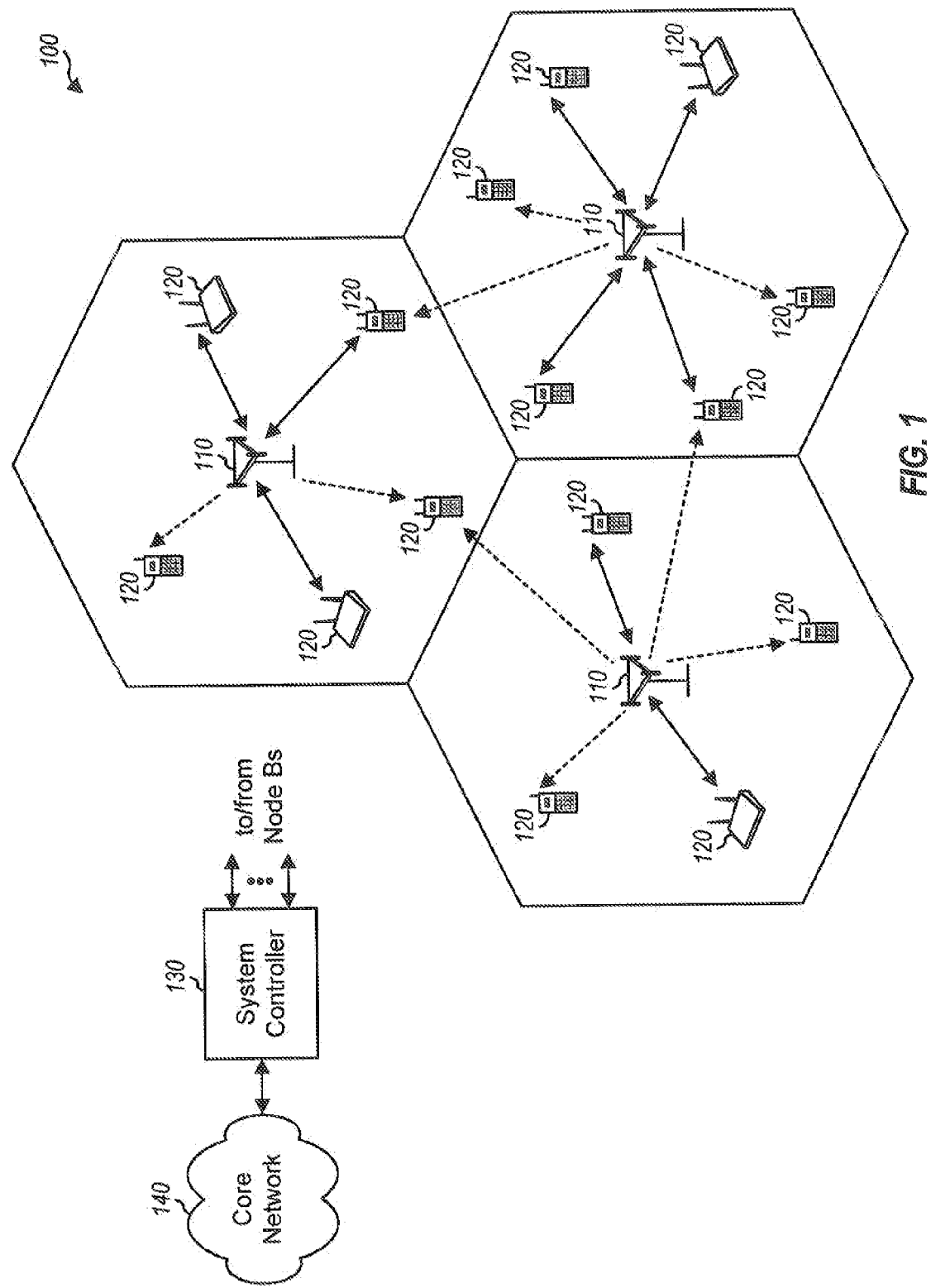
FIG. 1 shows a wireless communication network.

FIG. 1 shows a wireless communication network 100 that includes an Evolved Universal Terrestrial Radio Access Network (E-UTRAN) and a core network 140. The E-UTRAN includes multiple Node Bs 110 and a system controller 130. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. The term "cell" can refer to a Node B and/or its coverage area depending on the context in which the term is used. System controller 130 may couple to Node Bs 110 and provide coordination and control for these Node Bs. System controller 130 may be a single network entity or a collection of network entities, e.g., an Access Gateway (AGW), a Radio Network Controller (RNC), etc. System controller 130 may also originate and terminate messages for certain protocols and applications. Core network 140 may include various network entities that support various functions such as packet routing, user registration, mobility management, etc.

UEs 120 may be dispersed throughout network 100, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc. A UE may communicate with one or more Node Bs on the downlink and/or uplink at any given moment. The downlink (or forward link) refers to the communication link from the Node Bs to the UEs, and the uplink (or reverse link) refers to the communication link from the UEs to the Node Bs.

A UE may have a variety of IDs used to identify the UE for various purposes. These UE IDs may have different context or scope (e.g., cell, paging area, etc.) and/or different life spans (e.g., temporary or permanent). For example, the UE may be assigned (i) a long UE ID that may have wide scope and/or long life span and (ii) one or more short UE IDs that may have a more narrow scope and/or shorter life span. The UE IDs may be used for various purposes such as to direct scheduling messages, resource assignment messages, paging messages, and/or other messages to the UE.

Figure 2:
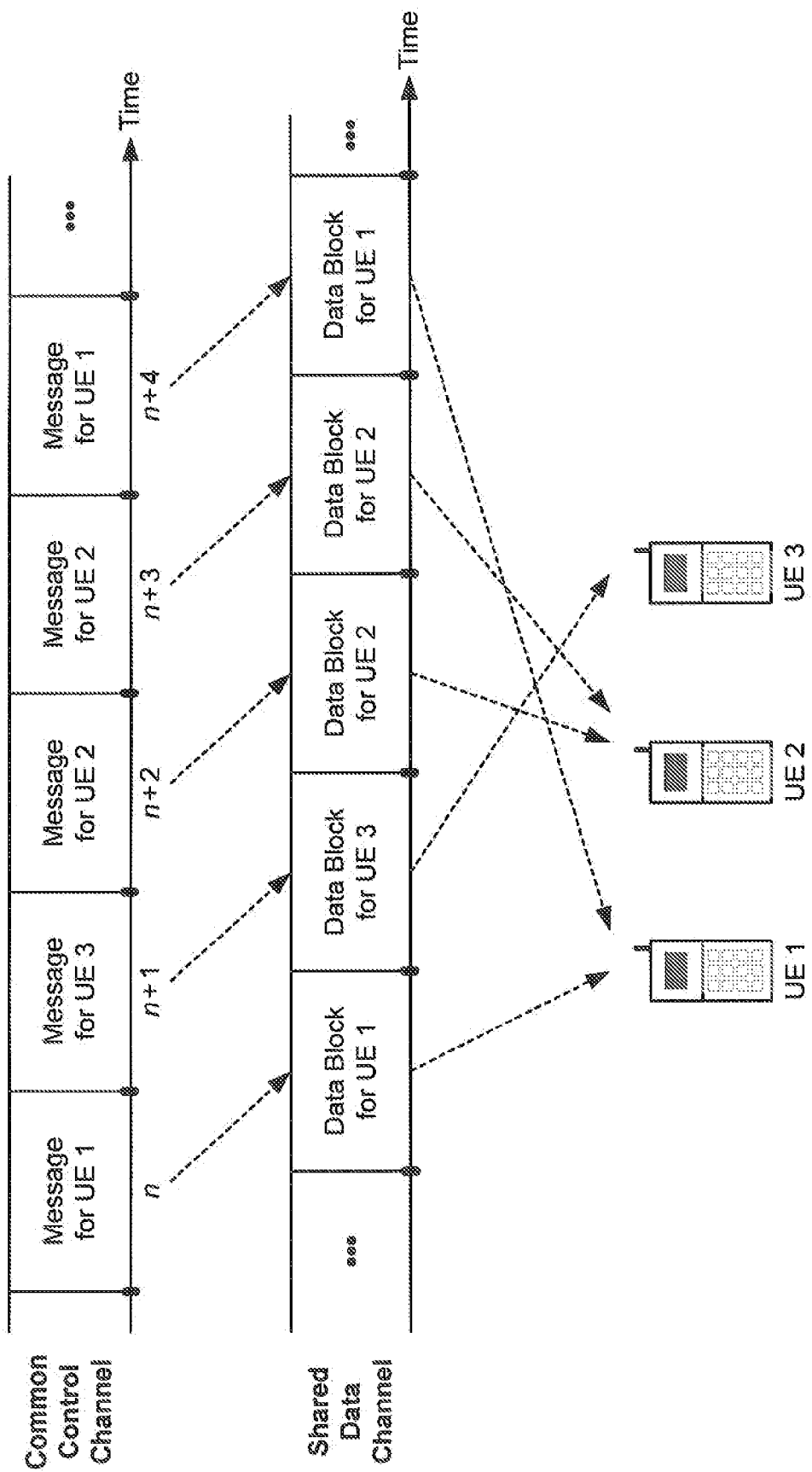
FIG. 2 shows transmission of scheduling messages and data.

FIG. 2 shows example transmissions of scheduling messages and data on the downlink. The transmission timeline may be partitioned into transmission time intervals (TTIs). A TTI may have a predetermined time duration, e.g., 2 milliseconds (ms), and may be the smallest unit of time in which a UE may be scheduled and served.

In the example shown in FIG. 2, a Node B serves one UE in each TTI. The Node B may send a scheduling message for a scheduled UE on a control channel and may send a data block to this UE on a data channel some predetermined amount of time later. A scheduling message may also be referred to as a scheduling block, a scheduling word, a packet format, etc. A data block may also be referred to as a packet, a frame, etc. The scheduling messages sent on the control channel may be addressed to specific UEs based on Medium Access Control IDs (MAC IDs) assigned to these UEs. In general, different types of UE IDs may be used for different applications (e.g., scheduling information, paging, etc.) and/or different layers (e.g., MAC layer, physical layer, etc.). MAC ID is one type of UE ID that is commonly used for signaling. Each UE that might receive data on the data channel may process the control channel in each TTI to determine whether a scheduling message is intended for that UE. A UE that is may match the scheduling messages received on the control channel with its MAC ID to determine whether any scheduling message is intended for that UE. A UE that is scheduled in a given TTI may process the data channel to recover the data block sent to the UE.

In the example shown in FIG. 2, UE 1 is scheduled in TTI n, UE 3 is scheduled in TTI n+1, UE 2 is scheduled in TTIs n+2 and n+3, and UE 1 is scheduled in TTI n+4. UE 1 receives scheduling messages in TTIs n and n+4 and processes the data channel in these TTIs to recover the data blocks sent to UE 1. UEs 2 and 3 similarly process the control and data channels to recover the scheduling messages and data blocks in their scheduled TTIs.

In the design shown in FIG. 2, the Node B may schedule individual UEs using the control channel and may send data to the scheduled UEs on the data channel. All UEs may receive the control channel. When a scheduling message indicates that a corresponding data block is intended for a particular UE, that UE knows to demodulate the data block from the data channel.

The MAC IDs may be assigned to the UEs by their serving Node Bs or some other network entities and may be used to identify these UEs for scheduling messages and other purposes. A MAC ID for a given UE may be valid for as long as the UE remains in an active state and is located in or sufficiently near the coverage area of its serving Node B. Since scheduling messages may be sent frequently, the MAC IDs should be as short as possible in order to reduce overhead of the control channel. The MAC IDs may be 16 bits long or may be of other lengths.

Figure 3:
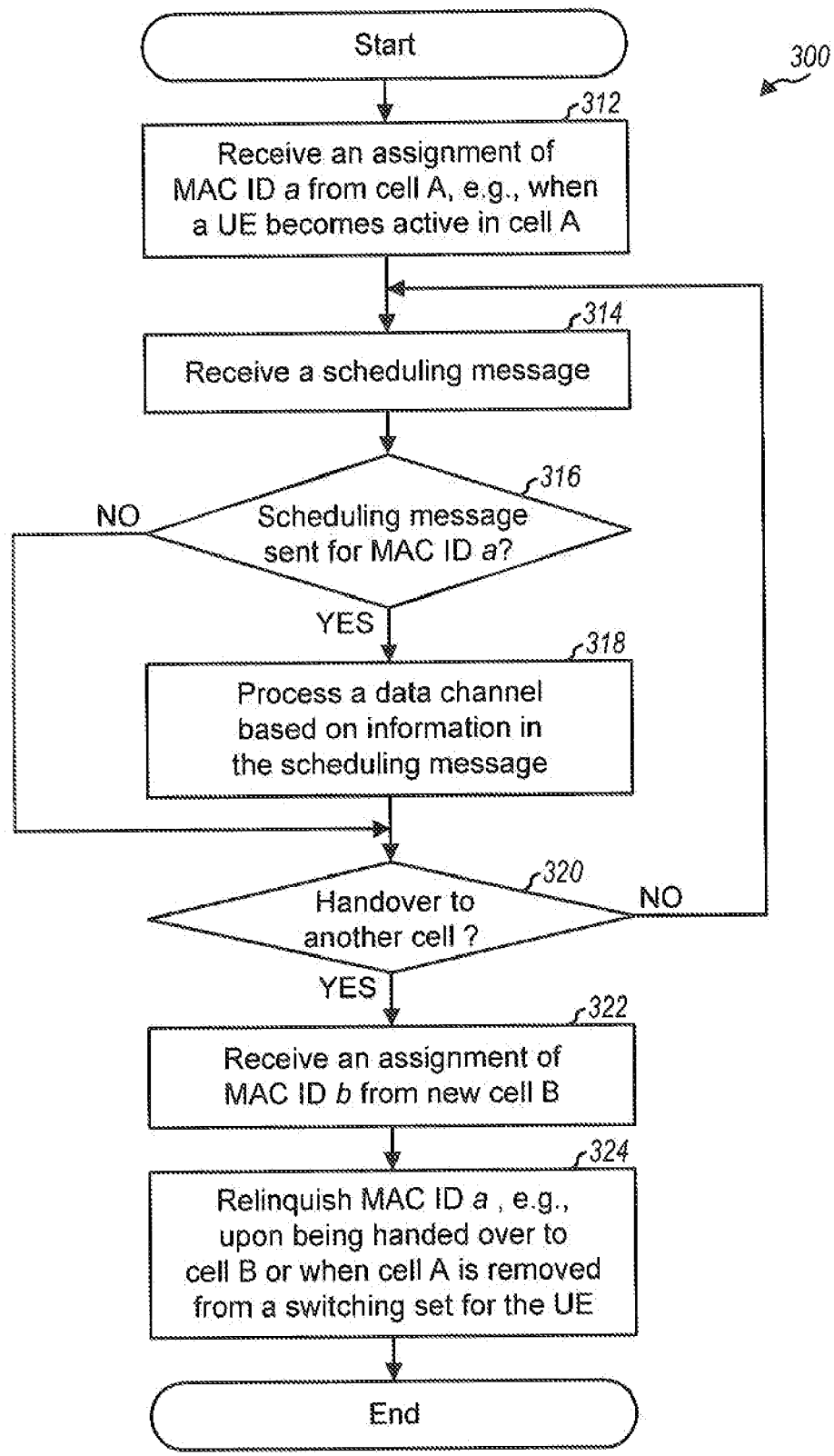
FIG. 3 shows a process for receiving and using MAC IDs.

FIG. 3 shows a process 300 performed by a UE to receive assignments of MAC IDs and to use the MAC IDs. The UE receives an assignment of MAC ID a from cell A, e.g., when the UE becomes active in cell A (block 312). While the UE remains active and in cell A, the UE monitors the control channel for scheduling messages addressed to MAC ID a (block 314). If a scheduling message is sent for MAC ID a, as determined in block 316, then the UE processes the data channel based on the information in the scheduling message (block 318). If the UE is not handed over to another cell, as determined in block 320, then the UE continues to monitor the control channel for scheduling messages addressed to MAC ID a (block 314).

Upon leaving cell A and being handed over to a new cell B, the UE receives an assignment of MAC ID b from cell B (block 322). The UE may then monitor the control channel for scheduling messages addressed to MAC ID b and receive data from the new cell B (not shown in FIG. 3). The UE may relinquish MAC ID a upon being handed over to cell B (block 324). Alternatively, the UE may retain MAC ID a until cell A is removed from a switching set maintained for the UE, which may occur at any time after the handover (also block 324). In any case, MAC ID a may be de-allocated from the UE and assigned to another UE in cell A.

In the design shown in FIG. 3, each cell may assign MAC IDs to UEs within that cell without coordination with other cells. A given MAC ID may be used in different cells to refer to different UEs. A MAC ID for a UE may be exchanged between cells (e.g., for handover of the UE) and may then be coupled with a cell ID as a disambiguation measure to uniquely identify the UE.

A MAC ID may act only as a "cookie" and may be used only for matching to allow a UE to recognize which scheduling messages are addressed to the UE. The UE may not need to be explicitly informed of its MAC ID in every scheduling message. Rather, the UE may need only sufficient information to allow it to answer the question "is this message for me or another UE?"

The MAC IDs may be used as temporary IDs that are not readily linked to permanent IDs of the UEs. However, a privacy threat may potentially exist if an eavesdropper or attacker can monitor the downlink and determine which transmissions address the same UE. For example, the attacker may monitor the control channel and determine that the messages sent in TTIs n and n+4 are both destined for UE 1 but may not know the true identity of UE 1. This type of attach is referred to as a linkability attack and may give rise to other related vulnerabilities. For example, the attacker may try to determine which MAC ID is assigned to a particular UE by simply initiating a packet data service to that UE and observing which MAC IDs have scheduled data at approximately the right time.

The scheduling messages may be ciphered to combat linkability attacks. However, ciphering the scheduling messages may impose excessive deciphering burden on the UEs, especially when each UE is required to decipher each scheduling message to determine whether that message is intended for that UE. It is desirable to secure the UE IDs without imposing this full deciphering burden.

In an aspect, a short UE ID may be derived for a UE based on a long UE ID assigned to the UE and may be used to address a message to the UE. In general, the long UE ID may be any ID assigned to the UE by any network entity and may have any life span. For example, the long UE ID may be (i) an ID assigned by a Node B such as a Cell Radio Network Temporary Identifier (C-RNTI), a MAC ID, etc., (ii) an ID assigned by the core network but known to the E-UTRAN, such as a Temporary Mobile Subscriber Identity (TMSI), a Packet TMSI (P-TMSI), etc., or (iii) some other ID or combination of IDs. The long UE ID may be assigned to the UE using a secure protocol and sent over the air with ciphering. The short UE ID may be used to uniquely identify the UE for a particular application, e.g., scheduling, and may be of a suitable length. Different short UE IDs may be generated in a deterministic manner based on the same long UE ID and used for different messages addressed to the UE. The short UE IDs may be used in place of the MAC IDs for message matching.

In general, a short UE ID may be generated from a long UE ID based on any transform function such as an irreversible function that makes it difficult to determine the long UE ID from the short UE ID. For example, the transform function may be a cryptographic/secure hash function that maps a message (e.g., the long UE ID) to a digest (e.g., the short UE ID) and has cryptographic properties so that (i) the function between the message and its digest is irreversible and (ii) the likelihood of two messages mapping to the same digest is very small. The output of the hash function may be referred to as a digest, a signature, a hashed value, etc.

A short UE ID may be generated further based on a salt value $\sigma$, which is a non-static value that may be selected in any manner. Different salt values may be used with a single long UE ID to generate different short UE IDs for different signaling messages. This may be effective in combating correlation attacks and improving security.

In one design, a cryptographic/secure hash function is used as the transform function. The hash function is parameterized by the salt value $\sigma$ and is denoted as $H_\sigma$. The hash function receives a long UE ID $R_x$ and the salt value $\sigma$ provides a short UE ID denoted as $H_\sigma(R_x)$. The hash function should have the following properties:

Knowing the salt value $\sigma$ and the short UE ID $H_\sigma(R_x)$, it should be computationally infeasible to determine the long UE ID $R_x$, When the long UE ID $R_x$ and the salt value $\sigma$ are known, computing the short UE ID $H_\sigma(R_x)$ should be computationally easy, and For values of $R_x$ in a range from which the long UE IDs are taken, the value $H_\sigma(R_x)$ should be, for each value of $\sigma$, in a range used for the short UE IDs.

The hash function $H_\sigma$ may be defined based on any parameterized cryptographic hash function known in the art. One well-known example of a parameterized cryptographic hash function is a UNIX function 'crypt( )'. Cryptographic hash functions such as SHA-1 (Secure Hash Algorithm), SHA-2 (which includes SHA-224, SHA-256, SHA-384 and SHA-512). MD-4 (Message Digest), MD-5, or other secure hash algorithms known in the art may be used in a parameterized form. The salt value $\sigma$ is a parameter that may be revealed without compromising the security of the hash function. The short UE ID $H_\sigma(R_x)$ and the salt value $\sigma$ may be sent in a message directed to the UE assigned with the long UE ID $R_x$. The salt value $\sigma$, and thus the short UE ID, may change for different messages.

Figure 4:
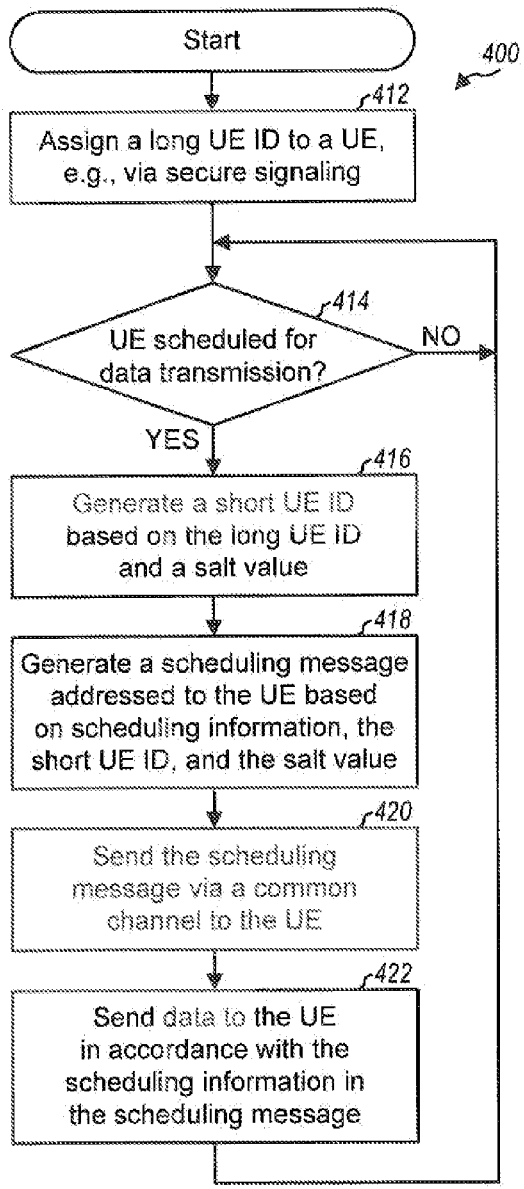
FIG. 4 shows a process for sending scheduling messages and data to a UE.

FIG. 4 shows a process 400 performed by a network entity (e.g., a Node B or a system controller) for sending scheduling messages and data to a UE. A long UE ID is assigned to the UE, e.g., via secure signaling (block 412). In general, the long UE ID may be assigned by any network entity at any time and may have any life span. In each scheduling interval, e.g., each TTI, a determination is made whether the UE is scheduled for data transmission (block 414). If the UE is scheduled, then a short UE ID is generated based on the long UE ID and a salt value $\sigma$ (block 416). A scheduling message addressed to the UE is generated based on scheduling information, the short UE ID, and the salt value (block 418). The scheduling message is sent via a common channel to the UE (block 420). Data is sent to the UE in accordance with the scheduling information in the scheduling message (block 422). The process then returns to block 414 for the next scheduling interval.

Figure 5:
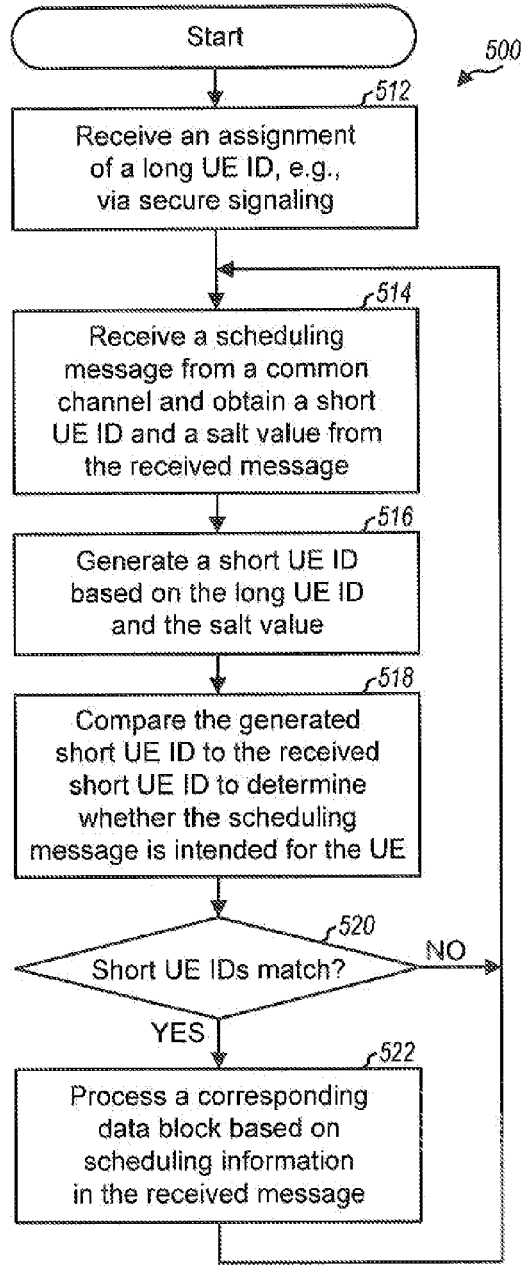
FIG. 5 shows a process for receiving scheduling messages and data at a UE.

FIG. 5 shows a process 500 performed by a UE for receiving scheduling messages and data. An assignment of a long UE ID is received, e.g., via secure signaling (block 512). In each scheduling interval, e.g., each TTI, a scheduling message is received from a common channel, and a short UE ID and a salt value $\sigma$ are obtained from the received message (block 514). A short UE ID is also generated based on the long UE ID and the salt value $\sigma$ obtained from the received message (block 516). The locally generated short UE ID is compared to the received short UE ID to determine whether the scheduling message is intended for the UE (block 518). If the two short UE IDs match, as determined in block 520, then the scheduling message is intended for the UE, and a corresponding data block is received and processed based on the scheduling information in the received message (block 522). After block 522 and also if the two short UE IDs do not match in block 520, the process returns to block 514 for the next scheduling interval.

The salt value σ may change with each scheduling message. In this case, an attacker may not be able to aggregate information for a given UE by monitoring the scheduling messages.

If the number of possible long UE IDs is sufficiently small, then an attacker may attempt to mount an exhaustion attack as follows. The attacker may generate a list of all possible long UE IDs, which may be denoted as $\{R_1, R_2, \ldots, R_K\}$, where K is the number of long UE IDs in the list. Upon seeing a scheduling message with salt value σ and short UE ID z, the attacker may generate all possible values of the form $H_\sigma(R_k)$, for $R_1$ through $R_K$, and may note the values of $R_k$ for which $H_\sigma(R_k)=z$. This may produce multiple candidates for the long UE ID of the UE receiving the data. However, over time, the long UE IDs that are actually in use may appear over and over in candidate lists. This may allow the attacker to build a list of long UE IDs that are apparently in use. Once a "live" long UE ID is determined, the attacker may use the same algorithm as the UE to monitor scheduling messages (e.g., as shown in FIG. 5) and accumulate information intended for the UE.

Long UE IDs of a sufficiently large size may render an exhaustion attack computationally infeasible. For long UE IDs of L bits, an exhaustion attack may perform $2^L$ comparisons of the hash function for each salt value σ. The long UE ID size may be selected based on the desired degree of security, the expected life span of the long UE IDs, etc. If the life span of a long UE ID is sufficiently brief, then the exhaustion attack may succeed too late. By the time the attacker has processed a number of scheduling messages and determined that a given long UE ID is in use in a cell, the UE with that long UE ID may have already been assigned a new long UE ID by the E-UTRAN. The E-UTRAN may thus compensate for any security weakness through frequent assignments of new long UE IDs to the UEs via secure signaling.

In another aspect, a short UE ID may be derived for a UE based on a long UE ID assigned to the UE, shared secret data known to the UE and the E-UTRAN, and possibly a salt value σ. The shared secret data may be exchanged securely between the UE and the E-UTRAN, e.g., at the start of a call, during handover, etc. The shared secret data may be of any length (e.g., very long) since it may be sent over the air just once. Once established, the shared secret data may remain unchanged at the UE, e.g., for as long as the UE remains in a connected state or for some other duration. Alternatively, the shared secret data may be updated by a hash function, as described below.

A transform function may receive the long UE ID, the shared secret data, and the salt value σ and generate a short UE ID. The shared secret data may act as another input to the transform function. The salt value σ and the short UE ID may be sent in a message whereas the shared secret data is not sent in the message. The use of the shared secret data to generate the short UE ID may thwart exhaustion attacks on the long UE IDs.

In yet another aspect, a long UE ID may be updated, e.g., whenever a short UE ID is generated. In general, the long UE ID may be updated based on any information, e.g., the current long UE ID, the shared secret data, the salt value σ, etc. The long UE ID may be updated based on a transform function F, which may be a hash function or some other function.

FIG. 6 shows a process 600 performed by a UE for receiving scheduling messages and data and updating a long UE ID. An assignment of a long UE ID is received (block 612). In each scheduling interval, a scheduling message is received from a common channel, and a short UE ID and a salt value σ are obtained from the received message (block 614). A short UE ID is also generated based on the current long UE ID, the salt value σ obtained from the received message, and shared secret data for the UE (block 616). The locally generated short UE ID is compared to the received short UE ID to determine whether the scheduling message is intended for the UE (block 618). If the two short UE IDs match, as determined in block 620, then a corresponding data block is received and processed based on scheduling information in the received message (block 622). The long UE ID may also be updated based on the current long UE ID, the shared secret data, the salt value σ, and/or other information (block 624). After block 624 and also if the two short UE IDs do not match in block 620, the process returns to block 614 for the next scheduling interval.

The E-UTRAN may autonomously update the long UE ID for the UE whenever a scheduling message is sent to the UE. Similarly, the UE may autonomously update its long UE ID whenever a scheduling message intended for the UE is received from the E-UTRAN. If the long UE ID is updated separately by the E-UTRAN and UE, then the E-UTRAN and UE may have different values of the long UE ID in certain failure cases. For example, if a scheduling message is lost over the air, without the E-UTRAN's knowledge, then the UE may not update its long UE ID as the E-UTRAN will expect. As another example, if the UE receives a scheduling message correctly but an acknowledgement (ACK) of that message is lost in transmission, then the UE may update its long UE ID but the E-UTRAN may not be informed. In both cases, the long UE ID maintained by the E-UTRAN may not match the long UE ID maintained by the UE. This de-synchronization may result in the E-UTRAN being unable to contact the UE using the long UE ID. A re-synchronization mechanism may be employed to ensure that the E-UTRAN and UE have the same long UE ID even in failure cases, as described below.

In yet another aspect, a long UE ID and shared secret data for a UE may be updated, e.g., whenever a short UE ID is generated. The long UE ID may be updated based on transform function F, and the shared secret data may be updated based on transform function G, each of which may be a hash function or some other function. Alternatively, the long UE ID and shared secret data may be jointly updated based on a common transform function. In any case, continually changing the shared secret data may offer additional measure of protection in cases where, for example, the shared secret data is short enough for exhaustion attacks to be feasible over a long term but within what would otherwise be the life span of the shared secret data.

FIG. 7 shows a process 700 performed by a UE for receiving scheduling messages and data sent and updating a long UE ID and shared secret data. Process 700 includes blocks 712 through 722 that correspond to blocks 612 through 622, respectively, in FIG. 6. If the locally generated short UE ID matches the received short UE ID obtained from a received message, as determined in block 720, then the long UE ID and shared secret data may be updated based on the current long UE ID, the current shared secret data, a salt value σ obtained from the received message, and/or other information (block 722). A synchronization mechanism may be employed to ensure synchronization of the long UE ID and shared secret data between the UE and the E-UTRAN.

If the long UE ID and/or shared secret data are updated after each scheduling message, then the E-UTRAN should have (i) a reliable way of determining whether the UE received the scheduling message and hence performed the update or (ii) a reliable low-overhead recovery mechanism for situations where the update was not performed by the UE. Either (i) or (ii) may be achieved based on an ACK sent by the UE for the scheduling message and/or an ACK sent by the UE for a data block associated with the scheduling message. Each ACK may be sent via dedicated signaling or embedded within an uplink message, e.g., a channel quality indicator (CQI) message. If the E-UTRAN receives an ACK for a data block, then the E-UTRAN may assume that the UE received the scheduling message and updated its long UE ID. In general, the UE may convey an ACK or some other information explicitly or implicitly and in any manner to indicate to the E-UTRAN that the UE has received the scheduling message.

If the E-UTRAN does not receive an ACK for a scheduling message sent to the UE, then there are two possibilities:

The UE did not received the scheduling message and hence did not update its long UE ID and/or shared secret data, or The UE received the scheduling message, updated its long UE ID and/or shared secret data, and sent an ACK, which was lost.

In either case, the E-UTRAN may not know whether the UE has updated its long UE ID and/or shared secret data. The E-UTRAN may detect loss of synchronization if it does not receive an ACK from the UE for the scheduling message sent to the UE.

In one design, the E-UTRAN may assign a new long UE ID and/or new shared secret data to the UE whenever loss of synchronization is detected. The E-UTRAN may send the new long UE ID and/or new shared secret data via secure signaling and addressed to the UE by a stable ID such as a TMSI or P-TMSI.

In another design, a re-synchronization mechanism may be employed to recover synchronization whenever the E-UTRAN does not know whether the UE has updated its long UE ID and/or shared secret data. If loss of synchronization is detected, then the E-UTRAN may use the previous long UE ID and shared secret data to address the UE. The E-UTRAN may send a scheduling message with a "previous ID" flag set to "1" to indicate that the previous long UE ID and shared secret data are being used for the message. When the UE receives the scheduling message with the flag set, the UE may perform matching using both its previous and current long UE IDs and shared secret data. If there is a match, then the UE may update its long UE ID and shared secret data based on the long UE ID and shared secret data that produced the match.

Figure 8:
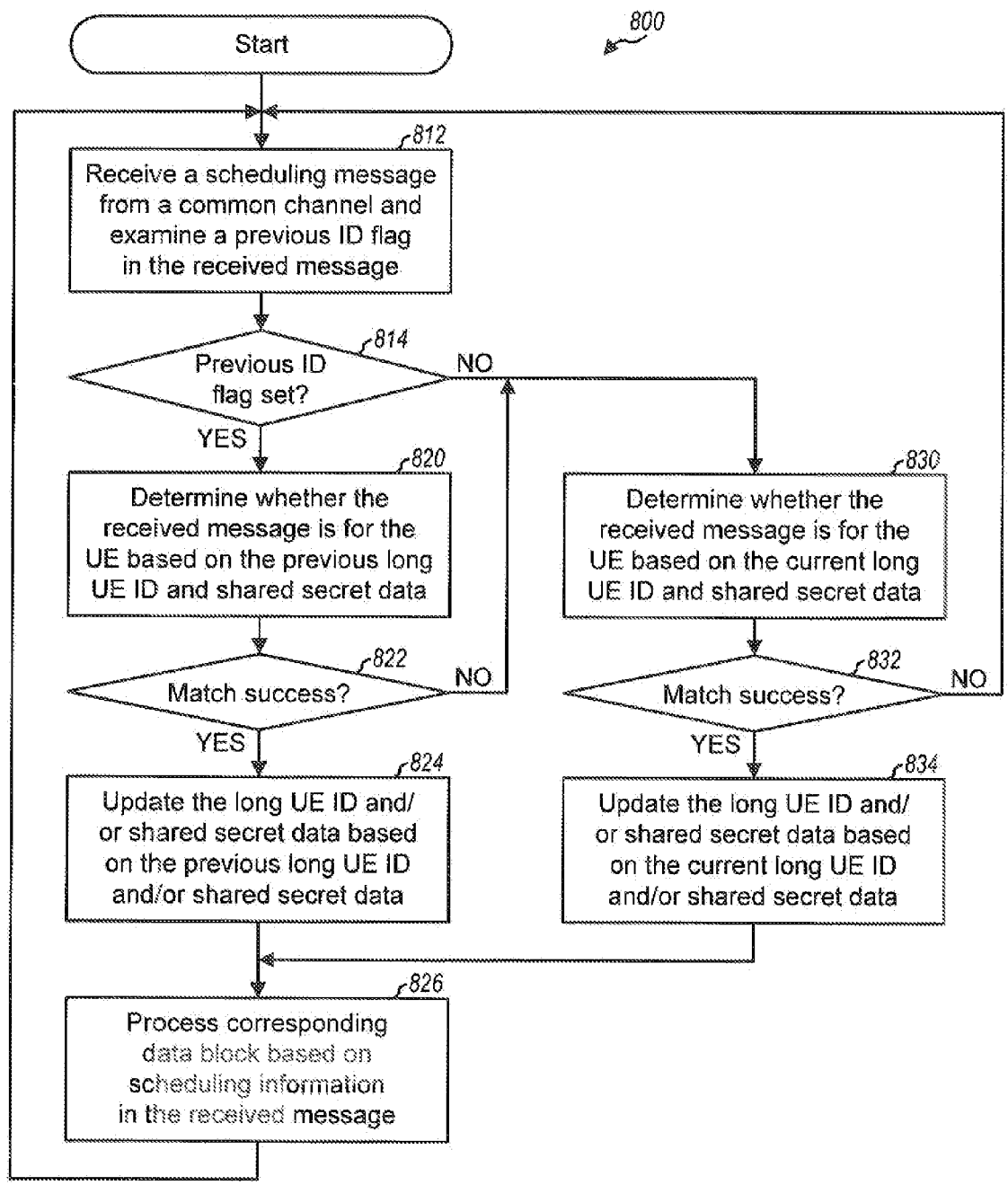
FIG. 8 shows a process for receiving scheduling messages and data and updating a long UE ID and shared secret data based on a previous ID flag.

FIG. 8 shows a process 800 performed by a UE for receiving scheduling messages and data and updating a long UE ID and shared secret data based on a previous ID flag. In each scheduling interval, a scheduling message is received from a common channel, and a previous ID flag in the received message is examined (block 812). If the flag is set, as determined in block 814, then whether the received message is for the UE is determined based on the previous long UE ID and the previous shared secret data for the UE (block 820). Block 820 may include blocks 616 and 618 in FIG. 6. If a match occurs and the received message is for the UE, as determined in block 822, then the long UE ID and/or shared secret data may be updated based on the previous long UE ID and/or the previous shared secret data (block 824). Otherwise, if a match does not occur in block 822 and also if the previous ID flag is not set in block 814, then whether the received message is for the UE is determined based on the current long UE ID and the current shared secret data (block 830). If a match occurs and the received message is for the UE, as determined in block 832, then the long UE ID and/or shared secret data may be updated based on the current long UE ID and/or the current shared secret data (block 834). After blocks 824 and 834, a corresponding data block is received and processed based on scheduling information in the received message (block 826).

After block 826 and also if there is no match in block 832, the process returns to block 812 for the next scheduling interval.

Figure 9A:
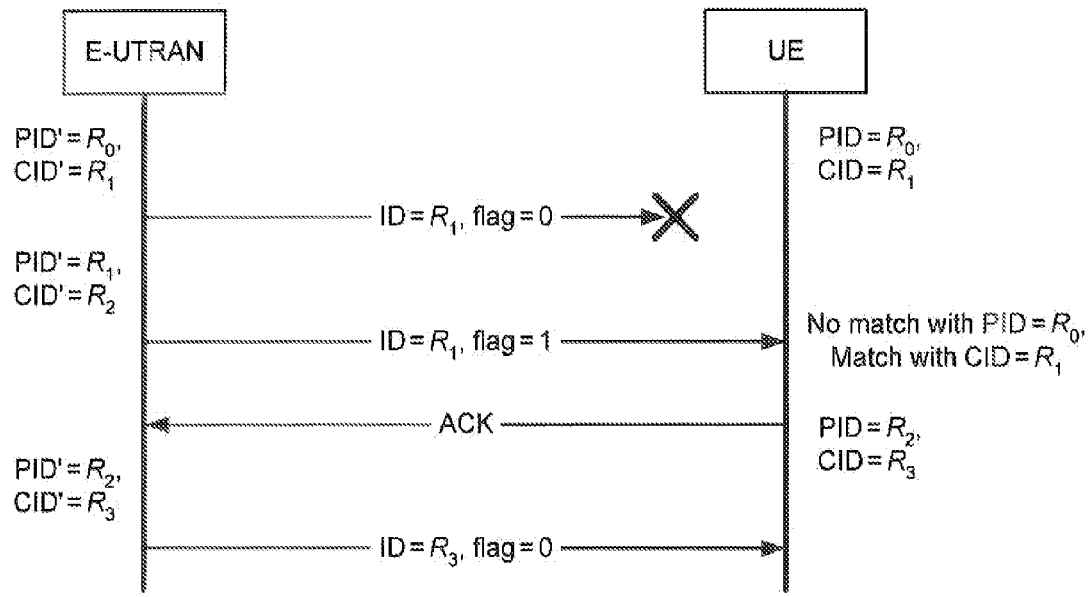
FIGS. 9A and 9B show operation of a re-synchronization mechanism.

FIG. 9A shows operation of the re-synchronization mechanism for a case in which a scheduling message does not reach the UE. The E-UTRAN and UE each begin with a previous long UE ID (PID) of $R_0$ and a current long UE ID (CID) of $R_1$ for the UE. The E-UTRAN sends a scheduling message with the current long UE ID of $R_1$ to the UE and updates the long UE ID as PID'=$R_1$ and CID'=$R_2$. The scheduling message is lost in transmission. The UE does not know that it should update its long UE ID and continues to use PID=$R_0$ and CID=$R_1$. The E-UTRAN does not receive an ACK from the UE and sends the next scheduling message for the UE using the previous long UE ID of $R_1$ and setting the previous ID flag.

The UE receives the scheduling message and, because the flag is set, checks the received message with the previous long UE ID of $R_0$, which does not match. The UE then checks the received message with the current long UE ID of $R_1$, which matches. The UE then recognizes that its current long UE ID of $R_1$ is equal to the previous long UE ID of $R_1$ at the E-UTRAN. The UE then updates its long UE ID once as PID=$R_1$ and CID=$R_2$ to match the updating by the E-UTRAN for the missed scheduling message. The UE further updates its long UE ID as PID=$R_2$ and CID=$R_3$ to match the updating by the E-UTRAN for the current scheduling message. The UE sends an ACK for the scheduling message. The E-UTRAN receives the ACK and updates the long UE ID as PID'=$R_2$ and CID'=$R_3$. The E-UTRAN recognizes that the UE has properly updated its long UE ID based on the received ACK and sends the next scheduling message for the UE using the current long UE ID of $R_3$ and with the previous ID flag cleared. The UE and E-UTRAN are now synchronized with the current long UE ID of $R_3$.

Figure 9B:
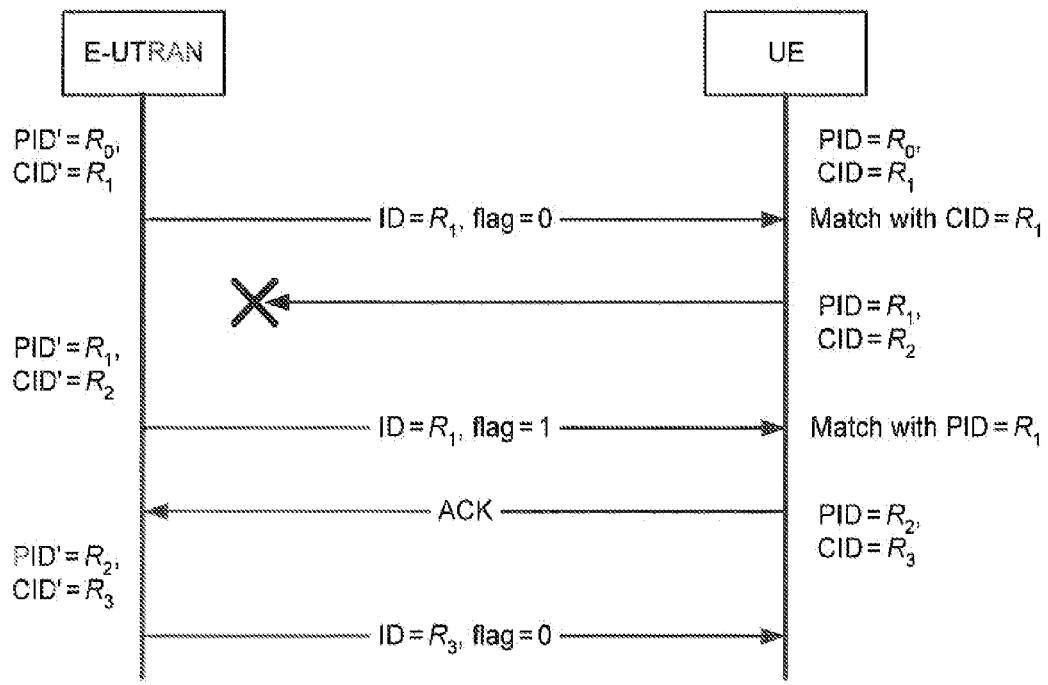

FIG. 9B shows operation of the re-synchronization mechanism for a case in which an ACK from the UE is lost en-route to the E-UTRAN. The E-UTRAN and UE each begin with a previous long UE ID of $R_0$ and a current long UE ID of $R_1$ for the UE. The E-UTRAN sends a scheduling message with the current long UE ID of $R_1$ to the UE and updates the long UE ID as PID'=$R_1$ and CID'=$R_2$. The UE receives the scheduling message, sends an ACK, and updates its long UE ID as PID=$R_1$ and CID=$R_2$. The ACK is lost, and the E-UTRAN does not know whether or not the UE has received the scheduling message and updated the long UE ID. The E-UTRAN sends the next scheduling message for the UE using the previous long UE ID of $R_1$ and setting the previous ID flag.

The UE receives the scheduling message and, because the flag is set, checks the received message with the previous long UE ID of $R_1$, which matches. The UE then recognizes that its previous long UE ID of $R_1$ is equal to the previous long UE ID of $R_1$ at the E-UTRAN. The UE then updates its long UE ID once as PID=$R_2$ and CID=$R_3$ to match the updating by the E-UTRAN for the current scheduling message. The UE sends an ACK for the scheduling message. The E-UTRAN receives the ACK and updates the long UE ID as PID=$R_2$ and CID=$R_3$. The E-UTRAN recognizes that the UE has properly updated its long UE ID based on the received ACK and sends the next scheduling message for the UE using the current long UE ID of $R_3$ and with the previous ID flag cleared. The UE and E-UTRAN are now synchronized with the current long UE ID of $R_3$.

In another design, the E-UTRAN updates the long UE ID and/or shared secret data for each scheduling message sent to the UE. The UE attempts to match a received message based on one or more long UE IDs. For example, the UE may attempt to match the received message based on the current long UE ID, then the previous long UE ID, then the future long UE ID, etc. Upon detecting a match, the UE knows the current long UE ID at the E-UTRAN and synchronizes its long UE ID with that of the E-UTRAN.

The salt value σ may be a selected to avoid collisions. A collision may occur when two long UE IDs $R_x$ and $R_y$ assigned to two UEs x and y are hashed to the same short UE ID, or $H_σ(R_x)=H_σ(R_y)$. IF a scheduling message is sent for UE x with this short UE ID, then UEs x and y may each detect the scheduling message as being directed to that UE and may assume that the corresponding data block is intended for the UE. This presents no problem for UE x, which receives the intended data block. However, UE y may receive a spurious data block, which if ciphered may produce random deciphered data. In any case, the spurious data block may be out of place in a data stream for UE y, and the resulting effect may depend on the particular behavior of the application receiving the data stream.

In general, impact due to collisions of long UE IDs may be dependent on the type of signaling being sent with the long UE IDs, the application behavior, etc. In some situations, collisions may be acceptable, e.g., when the data scheduled for the UE can only be understood by the intended recipient. Nevertheless, the E-UTRAN may attempt to prevent collisions in order to avoid possible adverse effects. Collisions may be avoided in various manners.

In one design for avoiding collisions, a Node B (or some other network entity) selects salt values known to have no collisions. The Node B may maintain a set of all long UE IDs assigned or assignable to the UEs within its coverage. For each possible salt value σ, the Node B may generate a set of short UE IDs based on the set of long UE IDs and that salt value. The Node B may scan the set of short UE IDs for duplicates and may reject this salt value if duplicates are detected. In general, a salt value that causes a collision for certain long UE IDs may still be used for other long UE IDs. However, in order to simplify implementation, the Node B may maintain a list of salt values that result in no duplicates over the entire set of long UE IDs. The salt values in this list may be selected for use. Collisions may also be avoided in other manners.

In general, a short UE ID may be generated based on any piece of pieces of information. For example, the short UE ID may be generated based on only the long UE ID, the long UE ID and the salt value, the long UE ID and the shared secret data, only the shared secret date, the shared secret data and the salt value, or a combination of the long UE ID, the salt value, and the shared secret data.

In general, any information may be updated by the E-UTRAN and UE. For example, only the salt value, only the long UE ID, only the shared secret data, the salt value and the long UE ID, the salt value and the shared secret data, the long UE ID and the shared secret data, or a combination of the salt value, the long UE ID, and the shared secret data may be updated. The updating may be performed after each scheduling message, after each time interval of a predetermined duration, etc.

For clarity, the use of short UE IDs for scheduling messages has been described above. The short UE IDs may also be used for other signaling messages such as paging messages, resource assignment messages, etc. For example, a short UE ID may be generated for a paging message directed to a specific UE. The short UE ID may be sent on a paging indicator channel to inform the UE that a paging message is sent on a paging channel to the UE. The short UE ID may also be sent with the paging message to address the message to the UE.

FIG. 10 shows a process 1000 performed by a network entity in a wireless communication network to send signaling messages and data to the UEs. The network entity may be a Node B, a system controller, etc., depending on the signaling messages being sent.

A first ID assigned to a UE and additional information such as, e.g., a salt value and/or shared secret data for the UE, may be transformed to obtain a second ID for the UE (block 1012). The first ID may be a long UE ID that may be assigned to the UE by any network entity. The first ID may be assigned to the UE by the same network entity that sends signaling messages to the UE or by another network entity. The first ID may be applicable in a single cell or across multiple cells. The first ID, the salt value, and/or the shared secret data may be transformed based on an irreversible function, a hash function, or some other functions to obtain the second ID. The salt value may be changed each time the first ID is transformed and may be selected to avoid collisions among a plurality of first IDs assigned to a plurality of UEs. Other types of additional information (e.g., time information such as a frame number) may also be used with the first ID to generate the second ID. The first ID and/or the shared secret data may be updated, e.g., whenever a scheduling message is sent to the UE. (block 1014). A previous first ID may be used if loss of synchronization of the first ID is detected, and a current first ID may be used if loss of synchronization is not detected.

A signaling message directed to the UE may be generated based on the second ID (block 1016). The signaling message may be a scheduling message, a paging message, or some other message and may include signaling information, the second ID, the salt value, etc. The signaling message may also include a flag that may be set if loss of synchronization of the first ID is detected. The signaling message may be sent via a common channel shared by the UE and other UEs (block 1018). If the signaling message is a scheduling message, then a data transmission may be sent based on scheduling information in the scheduling message (block 1020).

FIG. 11 shows an apparatus 1100 for sending signaling messages and data to the UEs. Apparatus 1100 includes means for transforming a first ID assigned to a UE and additional information such as, e.g., a salt value and/or shared secret data for the UE, to obtain a second ID for the UE (module 1112), means for updating the first ID and/or the shared secret data, e.g., whenever a scheduling message is sent to the UE (module 1114), means for generating a signaling message directed to the UE based on the second ID (module 1116), means for sending the signaling message via a common channel shared by the UE and other UEs (module 1118), and means for sending a data transmission based on scheduling information in the signaling message (module 1120). Modules 1112 to 1120 may comprise processors, electronics devices, hardware devices, electronics components, logical circuits, memories, etc., or any combination thereof.

FIG. 12 shows a process 1200 performed by a UE to receive signaling messages and data from a wireless communication network. A message may be received via a common channel shared by a plurality of UEs (block 1212). A first ID assigned to the UE and additional information such as, e.g., a salt value obtained from the received message and/or shared secret data for the UE, may be transformed to obtain a second ID for the UE (block 1214). The first ID may be assigned to the UE by the same network entity that sent the received message. Alternatively, the first ID may be assigned to the UE by one network entity, and the received message may be sent by another network entity.

Whether the received message is intended for the UE may be determined based on the second ID (block 1216). A previous first ID and/or a current first ID may be transformed depending on a flag in the received message. For example, the previous first ID may be transformed to obtain a previous second ID, which may be used to determine whether the received message is intended for the UE. If the received message does not match with the previous second ID, then the current first ID may be transformed to obtain a current second ID, which may be used to determine whether the received message is intended for the UE. Matching may also be attempted with the current first ID and then with the previous first ID. For message matching, a third ID may be obtained from the received message and compared to the second ID to determined whether the received message is intended for the UE. The message matching may also be performed in other manners. The first ID and/or the shared secret data may be updated, e.g., if the received message is intended for the UE (block 1218).

If the received message is a scheduling message intended for the UE, then scheduling information may be obtained from the received message (block 1220). A data transmission may be processed based on the scheduling information (block 1222).

FIG. 13 shows an apparatus 1300 for receiving signaling messages and data. Apparatus 1300 includes means for receiving a message via a common channel shared by a plurality of UEs (module 1312), means for transforming a first ID assigned to a UE and additional information such as e.g., a salt value obtained from the received message and/or shared secret data for the UE, to obtain a second ID for the UE (module 1314), means for determining whether the received message is intended for the UE based on the second ID (module 1316), means for updating the first ID and/or the shared secret data, e.g., if the received message is intended for the UE (module 1318), means for obtaining scheduling information from the received message if it is a scheduling message intended for the UE (module 1320), and means for processing a data transmission based on the scheduling information (module 1322). Modules 1312 to 1322 may comprise processors, electronics devices, hardware devices, electronics components, logical circuits, memories, etc., or any combination thereof.

Figure 14:
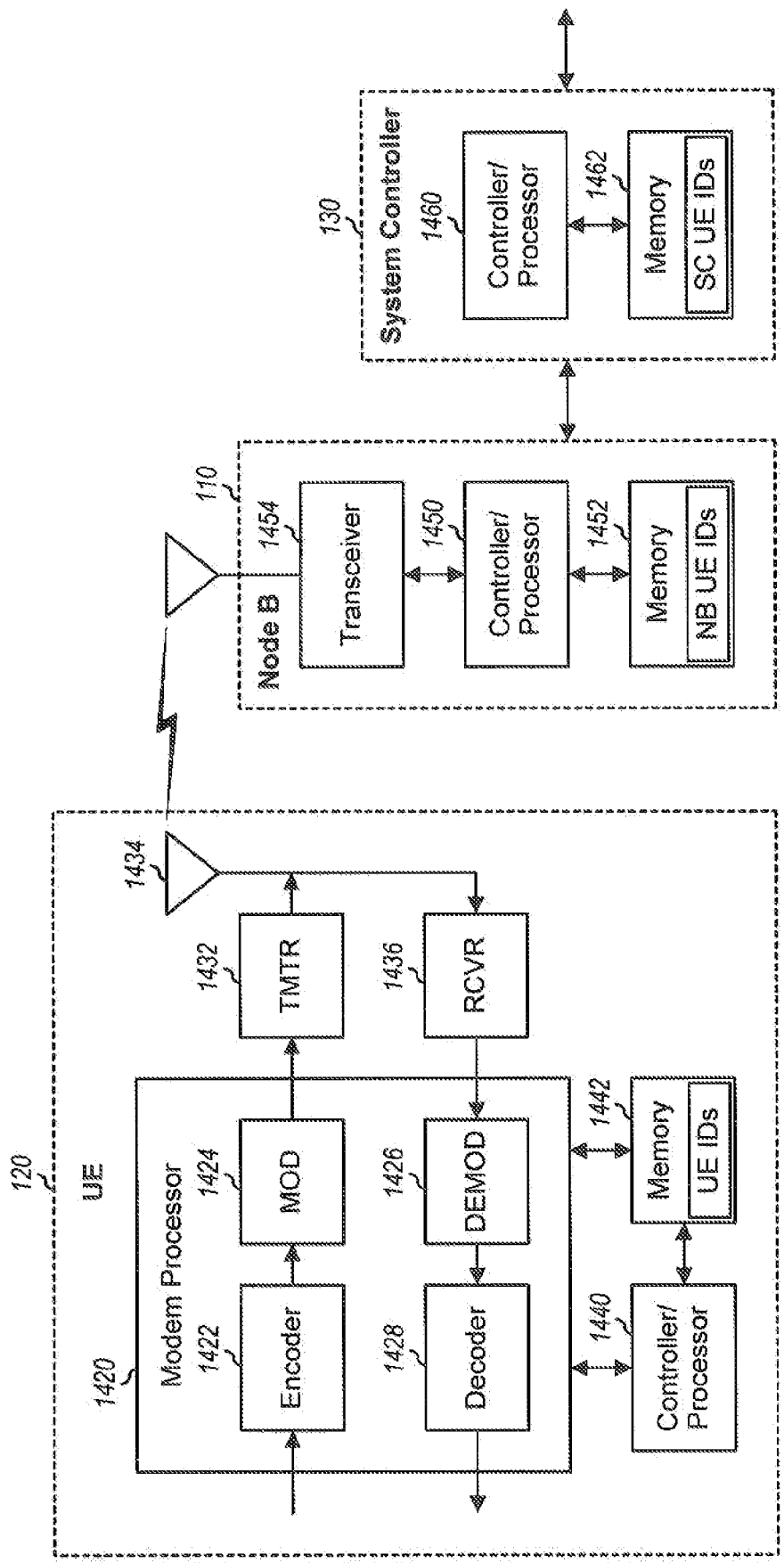
FIG. 14 shows a block diagram of a UE, a Node B, and a system controller.

FIG. 14 shows a block diagram of a design of a UE 120, a Node B 110, and system controller 130 in FIG. 1. On the uplink, data and signaling to be sent by UE 120 are processed (e.g., formatted, encoded, and interleaved) by an encoder 1422 and further processed (e.g., modulated, channelized, and scrambled) by a modulator (MOD) 1424 to generate output chips. A transmitter (TMTR) 1432 then conditions (e.g., converts to analog, filters, amplifies, and frequency upconverts) the output chips and generates an uplink signal, which is transmitted via an antenna 1434. On the downlink, antenna 1434 receives a downlink signal transmitted by Node B 110. A receiver (RCVR) 1436 conditions (e.g., filters, amplifiers, frequency downconverts, and digitizes) the received signal from antenna 1434 and provides samples. A demodulator (DEMOD) 1426 processes (e.g., descrambles, channelizes, and demodulates) the samples and provides symbol estimates. A decoder 1428 further processes (e.g., deinterleaves and decodes) the symbol estimates and provides decoded data. Encoder 1422, modulator 1424, demodulator 1426, and decoder 1428 may be implemented by a modem processor 1420. These units may perform processing in accordance with the radio technology (e.g., LTE, W-CDMA, etc.) implemented by the wireless communication network.

A controller/processor 1440 directs the operation at UE 120. Controller/processor 1440 may perform process 500 in FIG. 5, process 600 in FIG. 6, process 700 in FIG. 7, process 800 in FIG. 8, process 1200 in FIG. 12 and/or other processes for the techniques described herein. A memory 1442 stores program codes and data for UE 120 and may also store long and short UE IDs for UE 120.

FIG. 14 also shows a design of Node B 110 and system controller 130. Node B 110 includes a controller/processor 1450 that performs various functions for communication with the UEs, a memory 1452 that stores program codes and data for Node B 110, and a transceiver 1454 that supports radio communication with the UEs. Controller/processor 1450 may perform process 1000 in FIG. 10 and/or other processes for the techniques described herein. Memory 1452 may store long and short UE IDs for the UEs served by Node B 110, or NB UE IDs. System controller 130 includes a controller/processor 1460 that performs various functions to support communication for the UEs and a memory 1462 that stores program codes and data for system controller 130. Controller/processor 1460 may perform process 1000 in FIG. 10 and/or other processes for the techniques described herein. Memory 1462 may store long and short UE IDs for the UEs served by system controller 130, or SC UE IDs.

The techniques described herein may be implemented by various means. For example, these techniques may be implemented in hardware, firmware, software, or a combination thereof. For a hardware implementation, the processing units used to perform the techniques at a given entity (e.g., a UE, a Node B, a system controller, etc.) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software codes may be stored in a memory (e.g., memory 1442, 1452 or 1462 in FIG. 14) and executed by a processor (e.g., processor 1440, 1450 or 1460). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
   a processor configured to transform a first identifier assigned to a user equipment and additional information to obtain a second identifier for the user equipment that is shorter in size than the first identifier, to generate a signaling message directed to the user equipment based on the second identifier, and to send the signaling message to the user equipment via a common channel shared by the user equipment and other user equipments; and
   a memory coupled to the processor.

2. The apparatus of claim 1, wherein the second identifier is used to uniquely address the user equipment for the signaling message.

3. The apparatus of claim 1, wherein the processor is configured to assign the first identifier to the user equipment.

4. The apparatus of claim 1, wherein the processor is configured to receive at a first network entity information on the first identifier assigned to the user equipment by a second network entity.

5. The apparatus of claim 1, wherein the first identifier is applicable across multiple cells in a wireless communication network.

6. The apparatus of claim 1, wherein the additional information comprises a salt value, and wherein the processor is configured to hash the first identifier and the salt value to obtain the second identifier.

7. The apparatus of claim 6, wherein the processor is configured to generate the signaling message to include signaling information, the second identifier, and the salt value.

8. The apparatus of claim 1, wherein the additional information comprises shared secret data for the user equipment, and wherein the processor is configured to transform the first identifier and the shared secret data for the user equipment to obtain the second identifier.

9. The apparatus of claim 8, wherein the processor is configured to update the first identifier, or the shared secret data, or both the first identifier and the shared secret data.

10. The apparatus of claim 8, wherein the processor is configured to update the first identifier, or the shared secret data, or both the first identifier and the shared secret data after each signaling message sent to the user equipment.

11. The apparatus of claim 9, wherein the processor is configured to transform a previous first identifier and the additional information if loss of synchronization of the first identifier is detected, and to transform a current first identifier and the additional information if loss of synchronization is not detected.

12. The apparatus of claim 9, wherein the processor is configured to set a flag in the signaling message if loss of synchronization of the first identifier is detected.

13. The apparatus of claim 1, wherein the additional information comprises a salt value and shared secret data for the user equipment, and wherein the processor is configured to transform the first identifier, the shared secret data for the user equipment, and the salt value to obtain the second identifier.

14. The apparatus of claim 1, wherein the signaling message is a scheduling message or a paging message.

15. A method for a network entity comprising:
transforming a first identifier assigned to a user equipment and additional information to obtain a second identifier for the user equipment that is shorter in size than the first identifier;
generating a signaling message directed to the user equipment based on the second identifier; and
sending the signaling message to the user equipment via a common channel shared by the user equipment and other user equipment.

16. The method of claim 15, wherein the additional information comprises shared secret data for the user equipment, and wherein the transforming the first identifier comprises transforming the first identifier and the shared secret data for the user equipment to obtain the second identifier.

17. The method of claim 16, further comprising:
updating the first identifier, or the shared secret data, or both the first identifier and the shared secret data.

18. The method of claim 15, wherein the additional information comprises a salt value and shared secret data for the user equipment, and wherein the transforming the first identifier comprises transforming the first identifier, the shared secret data for the user equipment, and the salt value to obtain the second identifier.

19. An apparatus comprising:
means for transforming a first identifier assigned to a user equipment and additional information to obtain a second identifier for the user equipment that is shorter in size that the first identifier;
means for generating a signaling message directed to the user equipment based on the second identifier; and
means for sending the signaling message to the user equipment via a common channel shared by the user equipment and other user equipment.

20. The apparatus of claim 19, wherein the additional information comprises shared secret data for the user equipment, and wherein the means for transforming the first identifier comprises means for transforming the first identifier and the shared secret data for the user equipment to obtain the second identifier.

21. A non-transitory computer-readable medium including instructions stored thereon, which, when executed by a machine, cause the machine to perform operations for:
transforming a first identifier assigned to a user equipment and additional information to obtain a second identifier for the user equipment that is shorter in size than the first identifier;
generating a signaling message directed to the user equipment based on the second identifier; and
sending the signaling message to the user equipment via a common channel shared by the user equipment and other user equipments.

22. The computer-readable medium of claim 21, wherein the additional information comprises shared secret data for the user equipment, and wherein the transforming the first identifier comprises transforming the first identifier and the shared secret data for the user equipment to obtain the second identifier.

23. An apparatus comprising:
a processor configured to receive from a device an assignment of a first identifier to a user equipment, to receive from the device a message via a common channel shared by a plurality of user equipments, to transform the first identifier assigned to the user equipment and additional information to obtain a second identifier for the user equipment that is shorter in size than the first identifier, and to determine whether the received message is destined for the user equipment based on the second identifier, wherein the device is different than the user equipment; and
a memory coupled to the processor.

24. The apparatus of claim 23, wherein the processor is configured to receive the assignment of the first identifier from a first network entity and to receive the message from a second network entity.

25. The apparatus of claim 23, wherein the processor is configured to receive the assignment of the first identifier and the message from a single network entity.

26. The apparatus of claim 23, wherein the additional information comprises a salt value, and wherein the processor is configured to obtain the salt value from the received message and to hash the first identifier and the salt value to obtain the second identifier.

27. The apparatus of claim 23, wherein the additional information comprises shared secret data for the user equipment, and wherein the processor is configured to transform the first identifier and the shared secret data for the user equipment to obtain the second identifier.

28. The apparatus of claim 27, wherein the processor is configured to update the first identifier, or the shared secret data, or both the first identifier and the shared secret data.

29. The apparatus of claim 27, wherein the processor is configured to update the first identifier, or the shared secret data, or both the first identifier and the shared secret data after each reception of a message intended for the user equipment.

30. The apparatus of claim 28, wherein the processor is configured to transform a previous first identifier or a current first identifier based on a flag in the received message.

31. The apparatus of claim 28, wherein the processor is configured to transform a previous first identifier and the additional information to obtain a previous second identifier and to determine whether the received message is intended for the user equipment based on the previous second identifier and, if the received message does not match with the previous second identifier, to transform a current first identifier and the additional information to obtain a current second identifier and to determine whether the received message is intended for the user equipment based on the current second identifier.

32. The apparatus of claim 28, wherein the processor is configured to transform a current first identifier and the additional information to obtain a current second identifier and to determine whether the received message is intended for the user equipment based on the current second identifier and, if the received message does not match with the current second identifier, to transform a previous first identifier and the additional information to obtain a previous second identifier and to determine whether the received message is intended for the user equipment based on the previous second identifier.

33. The apparatus of claim 23, wherein the additional information comprises a salt value and shared secret data for the user equipment, and wherein the processor is configured to obtain the salt value from the received message and to transform the first identifier, the shared secret data for the user equipment, and the salt value to obtain the second identifier.

34. The apparatus of claim 23, wherein the processor is configured to obtain a third identifier from the received message and to compare the second identifier to the third identifier to determine whether the received message is intended for the user equipment.

35. The apparatus of claim 23, wherein the processor is configured to determine that the received message is intended for the user equipment, to obtain scheduling information from the received message, and to process a data transmission based on the scheduling information.

36. A method comprising:
receiving from a device an assignment of as first identifier to a user equipment, wherein the device is different than the user equipment;
receiving from the device a message via a common channel shared by a plurality of user equipments;
transforming the first identifier assigned to the user equipment and additional information to obtain a second identifier for the user equipment that is shorter in size than the first identifier; and
determining whether the received message is destined for the user equipment based on the second identifier.

37. The method of claim 36, wherein the additional information comprises shared secret data for the user equipment, and wherein the transforming the first identifier comprises transforming the first identifier and the shared secret data for the user equipment to obtain the second identifier.

38. The method of claim 37, further comprising:
updating the first identifier, or the shared secret data, or both the first identifier and the shared secret data.

39. The method of claim 36, wherein the additional information comprises a salt value and shared secret data for the user equipment, and wherein the transforming the first identifier comprises transforming the first identifier, the shared secret data for the user equipment, and the salt value from the received message to obtain the second identifier.

40. An apparatus comprising:
means for receiving from a device an assignment of a first identifier to a user equipment, wherein the device is different than the user equipment;
means for receiving from the device a message via a common channel shared by a plurality of user equipments;
means for transforming the first identifier assigned to the user equipment and additional information to obtain a second identifier for the user equipment that is shorter in size than the first identifier; and
means for determining whether the received message is destined for the user equipment based on the second identifier.

41. The apparatus of claim 40, wherein the additional information comprises shared secret data for the user equipment, and wherein the means for transforming the first identifier comprises means for transforming the first identifier and the shared secret data for the user equipment to obtain the second identifier.

42. A non-transitory computer-readable medium including instructions stored thereon, which, when executed by a machine, cause the machine to perform operations for:
receiving from a device an assignment of a first identifier to a user equipment, wherein the device is different than the user equipment;
receiving from the device a message via a common channel shared by a plurality of user equipments;
transforming the first identifier assigned to the user equipment and additional information to obtain a second identifier for the user equipment that is shorter in size than the first identifier; and
determining whether the received message is destined for the user equipment based on the second identifier.

43. The computer-readable medium of claim 42, wherein the additional information comprises shared secret data for the user equipment, and wherein the transforming the first identifier comprises transforming the first identifier and the shared secret data for the user equipment to obtain the second identifier.

* * * * *